United States Patent
Nishimoto et al.

(10) Patent No.: US 10,498,218 B2
(45) Date of Patent: Dec. 3, 2019

(54) SWITCHING CIRCUIT APPARATUS AND ELECTRIC POWER CONVERTER CAPABLE OF REDUCING COMMON MODE NOISE IN ASYMMETRIC CIRCUIT

(71) Applicant: Panasonic Intellectual Property Management Co., Ltd., Osaka (JP)

(72) Inventors: Taiki Nishimoto, Osaka (JP); Akira Minegishi, Osaka (JP); Atsushi Yamamoto, Kyoto (JP); Masahiro Yamaoka, Osaka (JP); Tohlu Matsushima, Fukuoka (JP); Osami Wada, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/321,250

(22) PCT Filed: Jul. 28, 2017

(86) PCT No.: PCT/JP2017/027360
§ 371 (c)(1),
(2) Date: Jan. 28, 2019

(87) PCT Pub. No.: WO2018/021510
PCT Pub. Date: Feb. 1, 2018

(65) Prior Publication Data
US 2019/0165666 A1 May 30, 2019

(30) Foreign Application Priority Data
Jul. 29, 2016 (JP) ................................. 2016-150447

(51) Int. Cl.
*H02M 1/12* (2006.01)
*H02M 3/155* (2006.01)
(Continued)

(52) U.S. Cl.
CPC ............. *H02M 1/12* (2013.01); *H02M 3/155* (2013.01); *H02M 3/1582* (2013.01); *H02M 3/18* (2013.01); *H02M 2001/123* (2013.01)

(58) Field of Classification Search
CPC ...... H02M 1/12; H02M 3/155; H02M 3/1582; H02M 3/18
(Continued)

(56) References Cited

U.S. PATENT DOCUMENTS

| 8,686,697 B2* | 4/2014 | Ujike | H02M 3/155 |
| | | | 323/222 |
| 2008/0061748 A1* | 3/2008 | Wang | H02M 1/4225 |
| | | | 323/222 |

(Continued)

FOREIGN PATENT DOCUMENTS

| JP | H05-121182 A | 5/1993 |
| JP | 2004-023825 A | 1/2004 |

(Continued)

OTHER PUBLICATIONS

English translation of the International Preliminary Report on Patentability issued in International Patent Applcation No. PCT/JP2017/027360, dated Feb. 7, 2019.

(Continued)

*Primary Examiner* — Nguyen Tran
(74) *Attorney, Agent, or Firm* — McDermott Will & Emery LLP

(57) ABSTRACT

A switching circuit apparatus includes: a first capacitance provided between a first port terminal and a the first terminal of a switching circuit unit, a second capacitance provided between the first terminal and a conductor part, and a first inductance provided between a second port terminal and a second terminal of the switching circuit unit. The switching circuit apparatus is provided with: a first capacitor connected (Continued)

between the first port terminal and the second port terminal, and a second inductor connected between the second terminal and the conductor part. The second inductor has such an inductance that a ratio of the inductance of the second inductor to the first inductance is equal to a ratio of the first capacitance to the second capacitance.

20 Claims, 12 Drawing Sheets

(51) Int. Cl.
*H02M 3/158* (2006.01)
*H02M 3/18* (2006.01)

(58) Field of Classification Search
USPC ................................. 323/222, 271, 282–285
See application file for complete search history.

(56) References Cited

U.S. PATENT DOCUMENTS

| | | | |
|---|---|---|---|
| 2013/0257393 A1* | 10/2013 | Hosotani | H02M 3/155 323/222 |
| 2016/0056711 A1 | 2/2016 | Umetani | |

FOREIGN PATENT DOCUMENTS

| | | |
|---|---|---|
| JP | 2011-259622 A | 12/2011 |
| JP | 2013-149755 A | 8/2013 |
| JP | 2013-223256 A | 10/2013 |
| JP | 2015-053770 A | 3/2015 |
| JP | 5826024 B2 | 12/2015 |
| JP | 2016-046819 A | 4/2016 |

OTHER PUBLICATIONS

International Search Report issued in Application No. PCT/JP2017/027360 dated Oct. 17, 2017, with English translation.

* cited by examiner

SWITCHING CIRCUIT APPARATUS AND ELECTRIC POWER CONVERTER CAPABLE OF REDUCING COMMON MODE NOISE IN ASYMMETRIC CIRCUIT

RELATED APPLICATIONS

This application is the U.S. National Phase under 35 U.S.C. § 371 of International Application No. PCT/JP2017/027360, filed on Jul. 28, 2017, which in turn claims the benefit of Japanese Application No. 2016-150447, filed on Jul. 29, 2016, the disclosures of which are incorporated by reference herein.

TECHNICAL FIELD

The present disclosure relates to a switching circuit apparatus and a power converter apparatus.

BACKGROUND ART

Recent power electronics circuits achieve power conversion by switching semiconductor devices. Although such a scheme has an advantageous feature of highly efficient power conversion, large electromagnetic noises are generated because of its operating principle, i.e., sharp changes in voltage and/or current. A large noise filter may be required to reduce noise transmitted from the circuit, and such a filter prevents an apparatus from being reduced in size.

According to conventional noise filters, common mode choke coils and Y capacitors (Y condensers) are used as countermeasure components for reducing common mode noise. However, in the power electronics circuit, there is a problem that capacitances of the Y capacitors are limited by regulations on a leakage current, and the common mode choke coils are increased in size in order to avoid magnetic saturation and reduce copper loss.

When reducing the size of a noise filter, since there is a limit in optimization of the filter itself, it is important to reduce an amount of noise being generated in a circuit as a noise source. In particular, in the power electronics circuits, since the common mode noise is dominant in frequency bands of 1 MHz or higher, it is important to reduce the common mode noise in a frequency band of 1 MHz to 100 MHz (hereinafter, referred to as "MHz band").

As circuits for reducing the common mode noise, there are, e.g., inventions disclosed in Patent Documents 1 and 2.

According to Patent Document 1, two terminals of a switching element as a noise source are connected to a power source via inductive lines on a substrate, and further connected to a metal housing through parasitic capacitances appearing between the lines and the housing. These noise sources, inductances, and parasitic capacitances constitute a bridge circuit. Patent Document 1 discloses reducing generation of a common mode noise by configuring the substrate so as to satisfy a certain relationship among the inductances and the parasitic capacitances.

In addition, Patent Document 2 discloses reducing a noise flowing out of a power supply circuit, by configuring a part of the power supply circuit, which is an insulated buck DC-DC converter, in a manner similar to the bridge circuit of Patent Document 1.

CITATION LIST

Patent Documents

PATENT DOCUMENT 1: Japanese Patent Laid-open Publication No. JP 2013-149755 A
PATENT DOCUMENT 2: Japanese Patent No. JP 5826024 B

SUMMARY OF INVENTION

Technical Problem

However, the inventions disclosed in Patent Documents 1 and 2 are assumed to be applied to a circuit highly symmetric between a circuit part including a positive bus line, and a circuit part including a negative bus line, such as a full-bridge circuit and an insulated buck DC-DC converter circuit. Therefore, the inventions disclosed in Patent Documents 1 and 2 can not be applied to a circuit highly asymmetric between a circuit part including a positive bus line, and a circuit part including a negative bus line, such as a non-insulated boost DC-DC converter circuit, and therefore, it is not possible to reduce generation of common mode noise in such a circuit.

An object of the present disclosure is to provide a switching circuit apparatus capable of reducing an amount of common mode noise being generated, even when the circuit is highly asymmetric between a circuit part including a positive bus line, and a circuit part including a negative bus line. Another object of the present disclosure is to provide a power converter apparatus including such a switching circuit apparatus.

Solution to Problem

According to an aspect of the present disclosure, a switching circuit apparatus is provided, including: a first port terminal and a second port terminal, a first inductor, a switching circuit unit including at least one switching element, and a conductor part. The switching circuit unit is provided with at least a first terminal and a second terminal, the first terminal being connected to the first port terminal via the first inductor, the second terminal being connected to the second port terminal. The switching circuit apparatus includes: a first capacitance provided between the first port terminal and the first terminal, a second capacitance provided between the first terminal and the conductor part, and a first inductance provided between the second port terminal and the second terminal. The switching circuit apparatus is further provided with: a first capacitor connected between the first port terminal and the second port terminal, and a second inductor connected between the second terminal and the conductor part.

Advantageous Effects of Invention

According to the switching circuit apparatus of the aspect of the present disclosure, it is possible to reduce an amount of common mode noise being generated, when the circuit is highly asymmetric between a circuit part including a positive bus line, and a circuit part including a negative bus line.

BRIEF DESCRIPTION OF DRAWINGS

FIG. 5 is a circuit diagram showing a current path in the switching circuit apparatus of FIG. 1 including the switching circuit unit 1a of FIG. 3, for the case in which a transistor T1 is turned on.

DESCRIPTION OF EMBODIMENTS

Prehistory of Present Disclosure

At first, a source of idea of the present inventors will be described below.

As described above, conventional circuits for reducing the common mode noise are assumed to be highly symmetric between a circuit part including a positive bus line, and a circuit part including a negative bus line, such as a full-bridge circuit, and a buck DC-DC converter circuit, the latter being limited to an insulated type.

For example, in the most basic non-insulated boost converter circuit, an inductor is inserted between an input terminal and a switching element on a positive bus line, but an input terminal and an output terminal on a negative bus line are short-circuited with a low inductance. The inductor has a large inductance, e.g., such as 10 μH to 1 mH. In addition, in the case of an inductor having a large current capacity, such as 10 A, a thick winding is used, and accordingly, a parasitic capacitance (interwire capacitance) of about 10 pF may appear between turns of the winding. Therefore, the inductor resonances by itself at a frequency (self-resonant frequency) of, e.g., several MHz, due to its own inductance and interwire capacitance, and the impedance of the positive bus line is not inductive at frequencies higher than the self-resonant frequency. Therefore, according to the prior art, it is not possible to sufficiently reduce the common mode noise of a circuit highly asymmetric between a circuit part including a positive bus line, and a circuit part including a negative bus line, such as a non-insulated boost converter circuit.

Therefore, there is a need for a switching circuit apparatus capable of reducing the amount of common mode noise being generated, even if when the circuit is highly asymmetric between the circuit part including the positive bus line, and the circuit part including the negative bus line.

Based on the above described source of idea, the present inventors have created circuit configurations of the present disclosure.

Hereinafter, embodiments according to the present disclosure will be described with reference to the drawings. In each of the following embodiments, the similar constituent elements are denoted by the same reference signs.

First Embodiment

Figure 1:
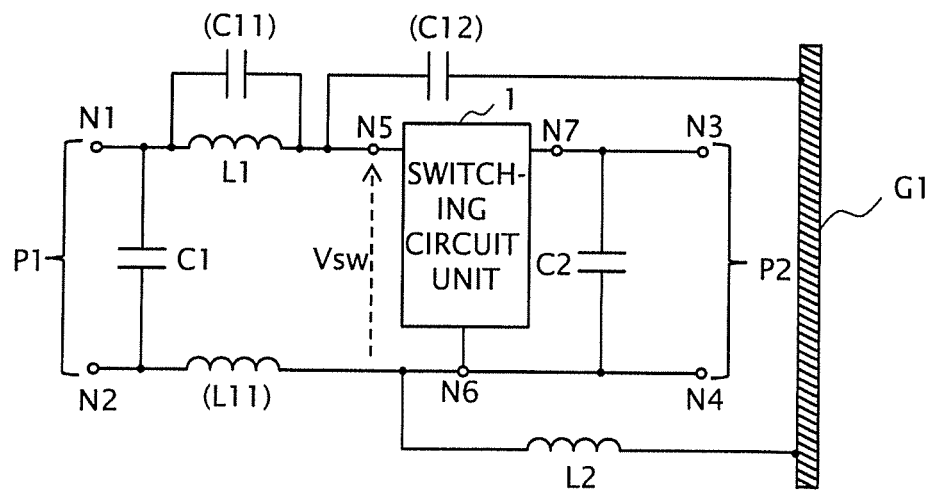
FIG. 1 is a circuit diagram showing a configuration of a switching circuit apparatus according to a first embodiment.

FIG. 1 is a circuit diagram showing a configuration of a switching circuit apparatus according to a first embodiment. The switching circuit apparatus of FIG. 1 is provided with port terminals N1 to N4, inductors L1 and L2, capacitors C1 and C2, a switching circuit unit 1, and a conductor part G1. The switching circuit apparatus of FIG. 1 operates as, e.g., a non-isolated boost converter.

The port terminals N1 and N2 constitute a first port P1 of the switching circuit apparatus, and the port terminals N3 and N4 constitute a second port P2 of the switching circuit apparatus. The port P1 is connected to, e.g., a power supply apparatus, and the port P2 is connected to, e.g., a load apparatus. In this case, the port terminals N1 and N2 are connected to a positive electrode and a negative electrode of the power supply apparatus, respectively, and a wiring line between the port terminals N1 and N3 constitutes a positive bus line, and the wiring line between the port terminals N2 and N4 constitutes a negative bus line. The switching circuit apparatus boosts DC power inputted from the port P1 and outputs the boosted voltage from the port P2. In this specification, the port terminals N1 and N2 are also referred to as "first and second port terminals", and the port terminals N3 and N4 are also referred to as "third and fourth port terminals".

The inductor L1 temporarily stores energy of the DC power inputted from the port P1, in order to boost the voltage. The inductor L1 has an inductance of, e.g., 10 μH to 1 mH. In this specification, the inductor L1 is also referred to as "first inductor".

The switching circuit unit 1 includes at least one switching element therein, and is further provided with terminals N5 to N7. The terminal N5 is connected to the port terminal N1 via the inductor L1. The terminal N6 is connected to the port terminals N2 and N4. The terminal N7 is connected to the port terminal N3. The terminals N5 and N6 are on a primary side of the switching circuit unit 1, and the terminals N6 and N7 are on a secondary side of the switching circuit unit 1. In this specification, the terminals N5 to N7 are also referred to as "first to third terminals".

Figure 2:
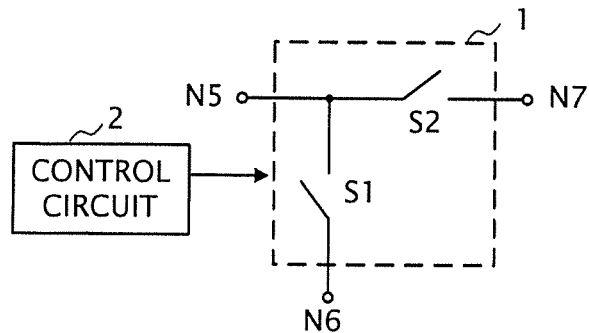
FIG. 2 is a circuit diagram showing a configuration of a switching circuit unit 1 of FIG. 1.

FIG. 2 is a circuit diagram showing a configuration of the switching circuit unit 1 of FIG. 1. The switching circuit unit 1 includes a first switching element S1 connected between the terminals N5 and N6, and a second switching element S2 connected between the terminals N5 and N7. The switching circuit apparatus of FIG. 1 is further provided with a control circuit 2 as shown in FIG. 2. The switching elements S1 and S2 are driven at a switching frequency of, e.g., 4 kHz to 200 kHz, under the control of the control circuit 2.

Figure 3:
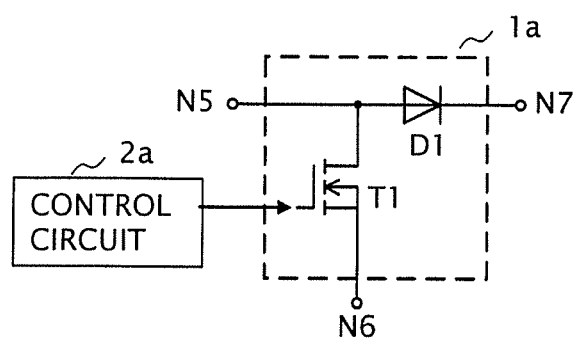
FIG. 3 is a circuit diagram showing a configuration of a first exemplary switching circuit unit 1a in the switching circuit apparatus of FIG. 1.

FIG. 3 is a circuit diagram showing a configuration of a first exemplary switching circuit unit 1a in the switching circuit apparatus of FIG. 1. The switching elements S1 and S2 in FIG. 2 may be a combination of a transistor T1 and a diode D1. In this case, only the transistor T1 is driven under the control of a control circuit 2a. The transistor T1 is, e.g., a MOSFET.

Figure 4:
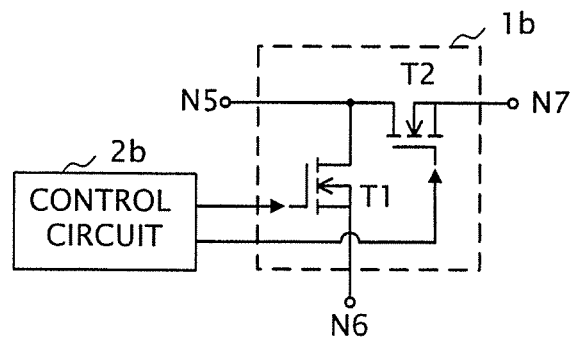
FIG. 4 is a circuit diagram showing a configuration of a second exemplary switching circuit unit 1b in the switching circuit apparatus of FIG. 1.

FIG. 4 is a circuit diagram showing a configuration of a second exemplary switching circuit unit 1b in the switching circuit apparatus of FIG. 1. The switching elements S1 and S2 in FIG. 2 may be transistors T1 and T2. In this case, both the transistors T1 and T2 are driven under the control of a control circuit 2b. The transistors T1 and T2 are, e.g., MOSFETs.

Referring again to FIG. 1, a capacitor C1 is connected between the port terminals N1 and N2. The capacitor C1 is an input capacitor of the switching circuit apparatus, having a capacitance of, e.g., 1 µF. A capacitor C2 is connected between the terminals N6 and N7. The capacitor C2 is a smoothing capacitor, having a capacitance of, e.g., 100 µF. In the present specification, the capacitor C1 is also referred to as "first capacitor", and the capacitor C2 is also referred to as "second capacitor".

The conductor part G1 may be, e.g., a metal housing or a heat sink of the switching circuit apparatus, or a ground conductor on a printed wiring board.

The inductor L2 is connected between the terminal N6 and the conductor part G1. In this specification, the inductor L2 is also referred to as "second inductor".

Figure 5:
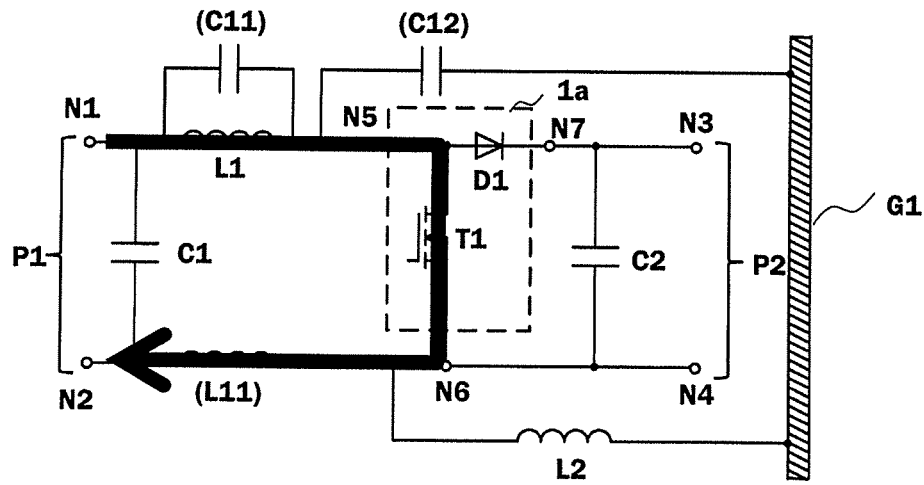
Figure 6:
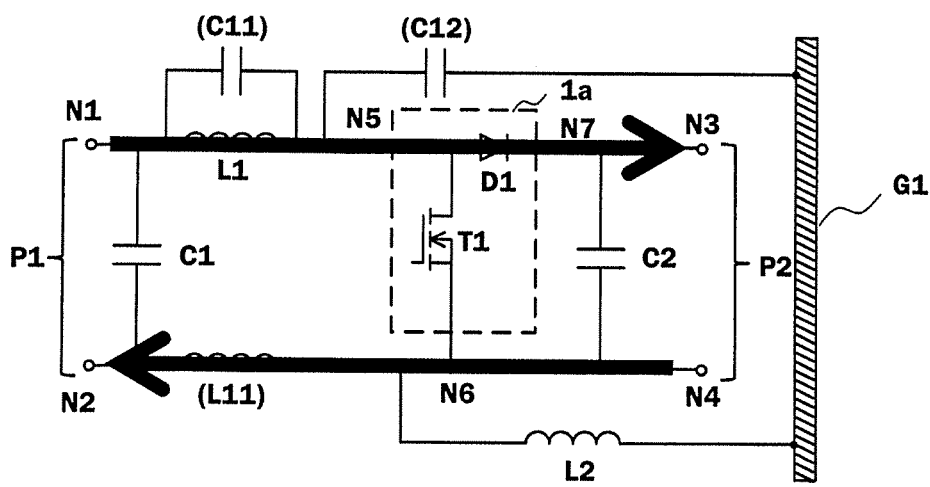
FIG. 6 is a circuit diagram showing a current path in the switching circuit apparatus of FIG. 1 including the switching circuit unit 1a of FIG. 3, for the case in which a transistor T1 is turned off.

Next, with reference to FIGS. 5 and 6, the operation of the switching circuit apparatus of FIG. 1 as a boost converter will be described. FIG. 5 is a circuit diagram showing a current path in the switching circuit apparatus of FIG. 1 including the switching circuit unit 1a of FIG. 3, for the case in which the transistor T1 is turned on. FIG. 6 is a circuit diagram showing a current path in the switching circuit apparatus of FIG. 1 including the switching circuit unit 1a of FIG. 3, for the case in which a transistor T1 is turned off. An input voltage is applied to the port P1. When the transistor T1 is turned on, a current flows through the path shown in FIG. 5, and magnetic energy is stored in the inductor L1 (operation mode 1). When the transistor T2 is turned off, a current flows through the path shown in FIG. 6, and the magnetic energy stored in the inductor L1 is released to the secondary side of the switching circuit unit 1 (operation mode 2). As a result, an output voltage smoothed by the capacitor C2 is generated on the port P2. The control circuit 2a of FIG. 3 alternates the operation modes 1 and 2 and adjusts a time ratio (duty ratio) of the operation mode 1 to the operation mode 2, and thus, it is possible to obtain a desired output voltage.

Next, reduction in common mode noise in the switching circuit apparatus of FIG. 1 will be described.

The switching circuit apparatus of FIG. 1 further has: a capacitance C11 provided between the port terminal N1 and the terminal N5, a capacitance C12 provided between the terminal N5 and the conductor part G1, and an inductance L11 provided between the port terminal N2 and the terminal N6. In the present specification, the capacitance C11 is also referred to as "first capacitance", the capacitance C12 is also referred to as "second capacitance", and the inductance L11 is also referred to as "first inductance". The capacitance C11 is, e.g., a parasitic capacitance of the winding of the inductor L1 (hereinafter, also referred to as parasitic capacitance C11). The capacitance C12 is, e.g., a parasitic capacitance appearing between a conductive portion of the switching element and the conductor part G1 (hereinafter, also referred to as parasitic capacitance C12). The inductance L11 is, e.g., a parasitic inductance of the wiring line between the port terminal N2 and the terminal N6 (hereinafter, also referred to as parasitic inductance L11). In FIG. 1 and the other drawings, parenthesized reference signs denote parasitic capacitances and parasitic inductances.

The switching circuit apparatus of FIG. 1 has the inductor L1 only in a circuit part including the positive bus line. The magnitude of the parasitic inductance L11 is, e.g., 100 nH. Therefore, the magnitude of the parasitic inductance L11 is significantly small as compared with the inductance of the inductor L1 of, e.g., 10 µH to 1 mH, as described above. In addition, in a frequency band equal to or higher than the resonance frequency of a parallel circuit part including the inductor L1 and the parasitic capacitance C11, the impedance between the port terminal N1 and the terminal N5 is capacitive. From the above reason, it can be said that the switching circuit apparatus of FIG. 1 is highly asymmetric between the circuit part including the positive bus line, and a circuit part including the negative bus line.

Figure 7:
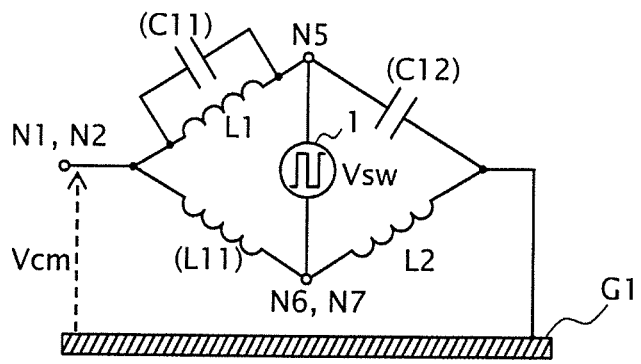
FIG. 7 is an equivalent circuit diagram of the switching circuit apparatus of FIG. 1.

FIG. 7 is an equivalent circuit diagram of the switching circuit apparatus of FIG. 1. FIG. 7 and the other equivalent circuit diagram equivalently shows the switching circuit apparatus at the frequency of the common mode noise (MHz band). In the MHz band, since the impedance of the capacitor C1 is low (for example, 1Ω or less), the port terminals N1 and N2 can be regarded as a single node. In the MHz band, since the impedance of the capacitor C2 is low (for example, 1Ω or less), the terminals N6 and N7 can also be regarded as a single node. The switching circuit unit 1 is a noise source generating switching noise having a voltage Vsw across the terminals N5 and N6, while operating. When the terminals N6 and N7 can be regarded as a single node, even if the switching circuit unit 1 includes two switching elements as shown in FIGS. 2 to 4, these switching elements can be represented as a single noise source. When the switching noise generated in the switching circuit unit 1 arrives the port terminals N1 and N2, the switching noise may further propagate from the port terminals N1 and N2 to preceding circuits, as common mode noise. The common mode noise propagating from the port terminals N1 and N2 of the switching circuit apparatus to the preceding circuits results from a voltage Vcm on the port terminals N1 and N2 with respect to a potential of the conductor part G1, if mode conversion outside the circuit can be ignored.

At a frequency ω equal to or higher than the resonance frequency of the parallel circuit part including the inductor L1 and the parasitic capacitance C11, the ratio of the common mode noise voltage Vcm to the switching noise voltage Vsw is given by the following Equation (1).

[Mathematical Expression 1]

$$\frac{Vcm}{Vsw} = \frac{j \cdot \omega \cdot L11}{1/(j \cdot \omega \cdot C11) + j \cdot \omega \cdot L11} - \frac{j \cdot \omega \cdot L2}{1/(j \cdot \omega \cdot C12) + j \cdot \omega \cdot L2} \quad (1)$$

Therefore, if a voltage transfer coefficient Vcm/Vsw from the switching circuit unit 1 to the port P1 is to be zero, then C11·L11=C12·L2 should be satisfied. That is, the inductor L2 should be connected between the terminal N6 and the conductor part G1, so as to satisfy the condition that the ratio of the inductance of the inductor L2 to the parasitic inductance L11 is equal to the ratio of the parasitic capacitance C11 to the parasitic capacitance C12 (i.e., L2/L11=C11/C12). In this case, since the voltage transfer coefficient Vcm/Vsw from the switching circuit unit 1 to the port P1 is zero, there is an advantageous effect of reducing the common mode noise propagating from the port P1 to the preceding circuits.

The above condition C11·L11=C12·L2 corresponds to the case where the ratio of the impedance of the parasitic capacitance C11 to the impedance of the parasitic inductance L11 is equal to the ratio of the impedance of the parasitic capacitance C12 to the impedance of the inductor L2. Since the switching circuit apparatus in FIG. 7 is configured as a Wheatstone bridge, the voltage transfer coefficient Vcm/Vsw from the switching circuit unit 1 to the port P1 is zero as described above.

In the above embodiments, it is important to accurately know the values of the parasitic capacitances C11, C12 and the parasitic inductance L11. A method of determining the values of the parasitic capacitances C11 and C12 and the parasitic inductance L11 will be described.

Figure 8:
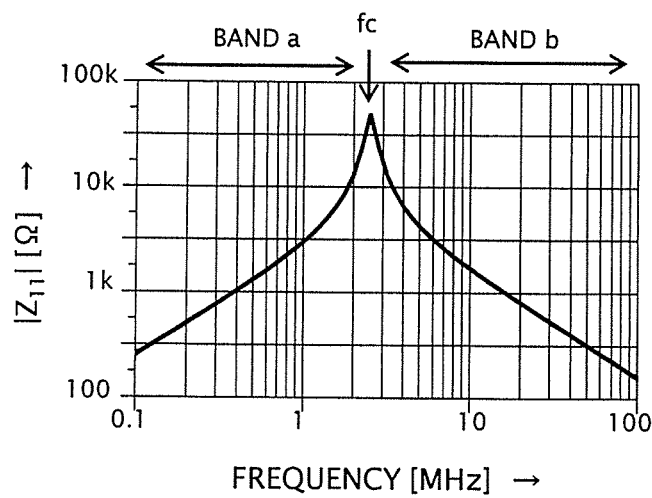
FIG. 8 is a graph showing frequency characteristics of impedance $Z_{11}$ of an inductor L1 of FIG. 1.

At first, the parasitic capacitance C11 is determined as follows. Since the inductor L1 is a component with two terminals, a one-port measurement for a port across these terminals is performed using a network analyzer or an impedance analyzer. FIG. 8 is a graph showing frequency characteristics of the impedance $Z_{11}$ of the inductor L1 of FIG. 1. For example, when the inductance of the inductor L1 is 400 µH, and the magnitude of the parasitic capacitance C11 of the winding is 10 pF, the impedance $Z_{11}$ is measured with the frequency characteristics as shown in FIG. 8. The inductor L1 has an anti-resonant frequency fc, and the impedance of the inductor L1 is inductive in a frequency band "a" lower than the anti-resonant frequency fc, and is capacitive in a frequency band "b" higher than the anti-resonant frequency fc. Therefore, the magnitude of the parasitic capacitance C11 can be calculated based on the frequency "f" in the frequency band "b", and the value of the impedance $Z_{11}$ corresponding to the frequency "f", that is, using C11=−1/{2πf·img($Z_{11}$)}, where img($Z_{11}$) denotes an imaginary part of the impedance $Z_{11}$.

Alternatively, the magnitude of the parasitic capacitance C11 may be calculated from the inductance of the inductor L1, and the anti-resonant frequency fc. The inductance of the inductor L1 can be calculated based on the frequency "f" in the frequency band "a", and the value of the impedance $Z_{11}$ corresponding to the frequency "f", that is, using L1=img($Z_{11}$)/(2πf). The magnitude of the parasitic capacitance C11 can be calculated based on the inductance of L1, using C11=1/{L1 (2πfc)$^2$}.

Next, the parasitic inductance L11 is determined as follows. The parasitic inductance L11 mainly appears in the wiring line. Therefore, the parasitic inductance L11 can be determined by conducting a simulation, such as the moment method.

Next, the parasitic capacitance C12 is determined as follows. The parasitic capacitance C12 mainly appears between the conductive portion of the switching element and the conductor part G1. For example, in the case of a TO-247 package MOSFET, the drain terminal is short-circuited with an electrode plate (heat radiator plate) on its back side, and therefore, if the package is fixed to the conductor part G1 using screws or the like, with a heat conductive sheet interposed therebetween, a parasitic capacitance appears between the terminal N5 and the conductor part G1. Therefore, it is possible to measure the parasitic capacitance C12 appearing between the drain terminal and the conductor part G1, using an LCR meter, when the package of the switching element alone is fixed to the conductor part G1. A network analyzer or an impedance analyzer may be used to measure the parasitic capacitance C12.

The inductor L2 can be implemented by inserting an inductor component between the terminal N6 and the conductor part G1. In this case, the ratio of the inductance of the inductor L2 to the parasitic inductance L11 can be easily designed, and therefore, there is an advantageous effect of facilitating noise reduction. Alternatively, the inductor L2 may be a meander line formed on the printed wiring board. In this case, no component is required for the inductor L2, and therefore, there is an advantageous effect of reducing the number of components, and cost. Since a large current does not flow in the inductor L2, the meander line may be of a small width, and the meander line can be formed in a small area.

Therefore, according to the switching circuit apparatus of the first embodiment, it is possible to reduce an amount of common mode noise being generated, even when a circuit is highly asymmetric between a circuit part including a positive bus line, and a circuit part including a negative bus line. Therefore, it is possible to omit noise countermeasure components for blocking noise, and therefore, there is an advantageous effect of reducing the size and cost of the switching circuit apparatus.

Although the capacitances C11 and C12 are parasitic capacitances in the above described case, each of the capacitance C11 and C12 may include a non-parasitic capacitance of a capacitor. The capacitance C11 may include the capacitance of a capacitor connected in parallel with the inductor L1. The capacitance C12 may include the capacitance of a capacitor connected between the terminal N5 and the conductor part G1. By using a non-parasitic capacitance of a capacitor for at least a part of at least one of the capacitance C11 and C12, the ratio of the capacitance C11 to the capacitance C12 can be easily designed, and therefore, there is an advantageous effect of facilitating noise reduction.

On the other hand, in the case that the capacitance C11 is the parasitic capacitance of the winding of the inductor L1 as described above, since the parasitic capacitance C11 resides in the inductor L1 itself, there is an advantageous effect of reducing the number of components, a mounting area, and cost. In addition, in the case that the capacitance C12 is a parasitic capacitance appearing between the conductive portion of the switching element and the conductor part G1 as described above, no component is required for the parasitic capacitance C12, and therefore, there is an advantageous effect of reducing the number of components and cost.

In addition, at least one of the capacitance C11 and C12 may be a combination of a parasitic capacitance, and a non-parasitic capacitance of a capacitor.

Similarly, although the inductance L11 is a parasitic inductance in the above described case, the inductance L11 may include a non-parasitic inductance of an inductor. The inductance L11 may include an inductance of an inductor connected between the port terminal N2 and the terminal N6. In this case, the ratio of the inductance of the inductor L2 to the parasitic inductance L11 can be easily designed, and therefore, there is an advantageous effect of facilitating noise reduction.

On the other hand, in the case that the inductance L11 is the parasitic inductance of the wiring line between the port terminal N2 and the terminal N6 as described above, no component is required for the parasitic inductance L11, and therefore, there is an advantageous effect of reducing the number of components and cost.

In addition, the inductance L11 may be a combination of a parasitic inductance, and a non-parasitic inductance of an inductor.

The first embodiment is not limited to a boost converter, and can be applied to any switching circuit apparatus including a noise source of switching noise (that is, a potential noise source of common mode noise). Referring to FIG. 1 to describe the configuration of such a switching circuit apparatus, the switching circuit apparatus is provided with: port terminals N1 and N2, the inductor L1, the switching circuit unit 1 including at least one switching element, and the conductor part G1. The switching circuit unit 1 is provided with at least terminals N5 and N6, the terminal N5 being connected to the port terminal N1 via the inductor L1, and the terminal N6 being connected to the port terminal N2. The switching circuit apparatus has: the capacitance C11 provided between the port terminal N1 and the terminal N5, the capacitance C12 provided between the terminal N5 and the conductor part G1, and the inductance L11 provided between the port terminal N2 and the terminal N6. The switching circuit apparatus is further provided with: the capacitor C1 connected between the port terminals N1 and N2, and the inductor L2 connected between the terminal N6 and the conductor part G1. The inductor L2 has the inductance such that the ratio of the inductance of the inductor L2 to the inductance L11 is equal to the ratio of the capacitance C11 to the capacitance C12. Thus, it is possible to reduce the common mode noise propagating from the switching circuit apparatus to circuits connected to the port terminals N1 and N2.

Next, with reference to FIGS. 9 and 10, a switching circuit apparatus according to a first modified embodiment of the first embodiment will be described.

Figure 9:
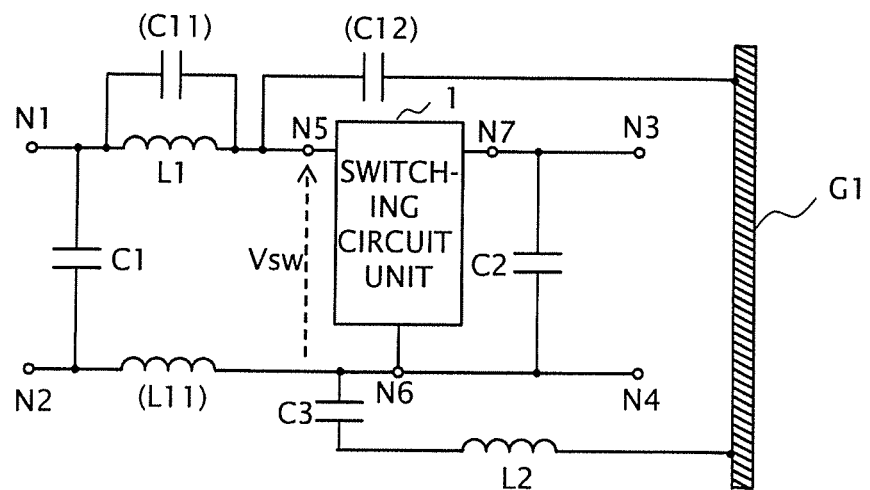
FIG. 9 is a circuit diagram showing a configuration of a switching circuit apparatus according to a first modified embodiment of the first embodiment.

FIG. 9 is a circuit diagram showing a configuration of a switching circuit apparatus according to the first modified embodiment of the first embodiment. The switching circuit apparatus of FIG. 9 is the components of the switching circuit apparatus of FIG. 1, and further provided with a capacitor C3 connected between the terminal N6 and the conductor part G1, in series with an inductor L2. In the switching circuit apparatus of FIG. 1, since the negative bus line and the conductor part G1 are connected via an inductor L2, it can not be used for equipment requiring insulation between the negative bus line and the conductor part G1. On the other hand, in the switching circuit apparatus of FIG. 9, the negative bus line and the conductor part G1 are insulated by the capacitor C3. In this specification, the capacitor C3 is also referred to as "third capacitor".

Figure 10:
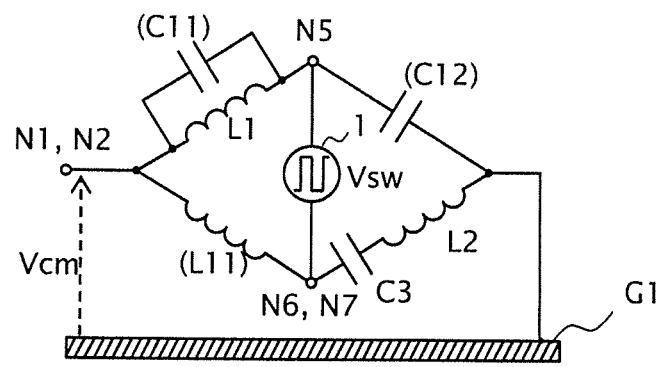
FIG. 10 is an equivalent circuit diagram of the switching circuit apparatus of FIG. 9.

FIG. 10 is an equivalent circuit diagram of the switching circuit apparatus of FIG. 9. The impedance between the terminal N6 and the conductor part G1 is inductive in a frequency band equal to or higher than the resonance frequency of the series circuit part including the inductor L2 and the capacitor C3. Therefore, similarly to the switching circuit apparatus of FIG. 1, the ratio of the inductance of the inductor L2 to the parasitic inductance L11 is set equal to the ratio of the parasitic capacitance C11 to the parasitic capacitance C12. In this case, there is an advantageous effect of reducing the common mode noise in the frequency band equal to or higher than the resonance frequency of the series circuit part including the inductor L2 and the capacitor C3. Thus, it is possible to omit noise countermeasure components for blocking noise, while achieving the insulation between the negative bus line and the conductor part G1, and therefore, there is an advantageous effect of reducing the size and cost of the switching circuit apparatus.

When the negative bus line and the conductor part G1 are insulated by the capacitor C3, since a large current does not flow through the inductor L2, it is possible to use a small inductor component having a small rated current.

The resonance frequency of the series circuit part including the inductor L2 and the capacitor C3 may be set equal to the resonance frequency of the parallel circuit part including the inductance L1, the latter resonance frequency being determined by the inductance of the inductor L1 and the parasitic capacitance C11. In this case, there is an advantageous effect of reducing the common mode noise in a frequency band not only equal to or higher than, but also below the resonance frequency of the parallel circuit part including the inductor L1 and the parasitic capacitance C11, but also in a frequency band below this resonance frequency.

Next, with reference to FIGS. 11 and 12, a switching circuit apparatus according to a second modified embodiment of the first embodiment will be described.

Figure 11:
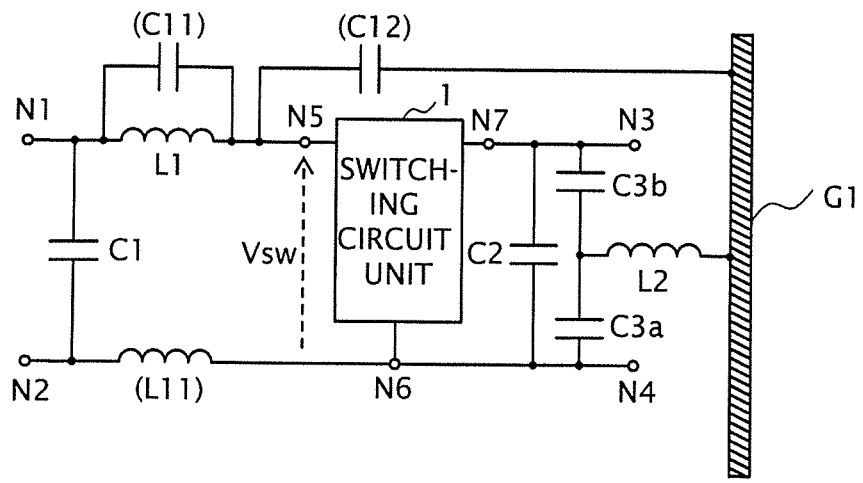
FIG. 11 is a circuit diagram showing a configuration of a switching circuit apparatus according to a second modified embodiment of the first embodiment.

FIG. 11 is a circuit diagram showing a configuration of a switching circuit apparatus according to the second modified embodiment of the first embodiment. The switching circuit apparatus of FIG. 11 is provided with the components of the switching circuit apparatus of FIG. 1, and further provided with capacitors C3a and C3b, which constitute Y capacitors. The capacitors C3a and C3b are connected in series between the port terminals N3 and N4, and the connection point of the capacitors C3a and C3b is connected to the conductor part G1 via the inductor L2. The capacitor C3a corresponds to the capacitor C3 in FIG. 9. In other words, the capacitor C3a is connected between the terminal N6 and the conductor part G1, in series with the inductor L2, and the inductor L2 is connected to the terminal N6 via the capacitor C3a. The connection point of the inductor L2 and the capacitor C3a is connected to the terminal N7 via the capacitor C3b. In this specification, the capacitors C3a and C3b are also referred to as "third and fourth capacitors".

Figure 12:
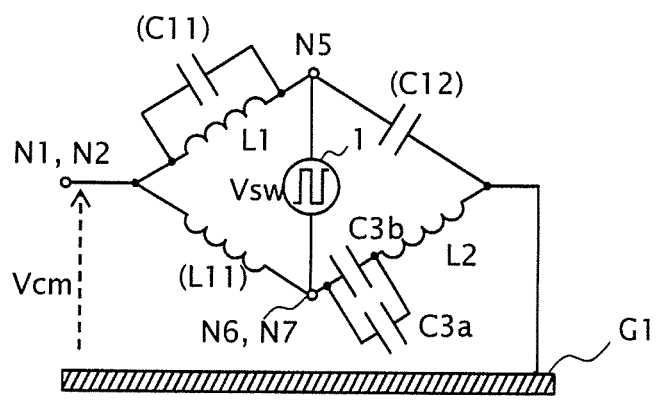
FIG. 12 is an equivalent circuit diagram of the switching circuit apparatus of FIG. 11.

FIG. 12 is an equivalent circuit diagram of the switching circuit apparatus of FIG. 11. The switching circuit apparatus of FIG. 12 is configured in a manner similar to that of the switching circuit apparatus of FIG. 10, except that the capacitor C3 of FIG. 10 is replaced with the capacitors C3a and C3b connected in parallel to each other. Therefore, the switching circuit apparatus of FIG. 11 has an advantageous effect of reducing the common mode noise according to the similar principle to that in Equation (1).

The resonance frequency of the series circuit part including the inductor L2 and the capacitors C3a and C3b may be set equal to the resonance frequency of the parallel circuit part including the inductance L1, the latter resonance frequency being determined by the inductance of the inductor L1 and the parasitic capacitance C11. In this case, there is an advantageous effect of reducing the common mode noise in a frequency band not only equal to or higher than, but also below the resonance frequency of the parallel circuit part including the inductor L1 and the parasitic capacitance C11.

Next, with reference to FIGS. 13 and 14, a switching circuit apparatus according to a third modified embodiment of the first embodiment will be described.

Figure 13:
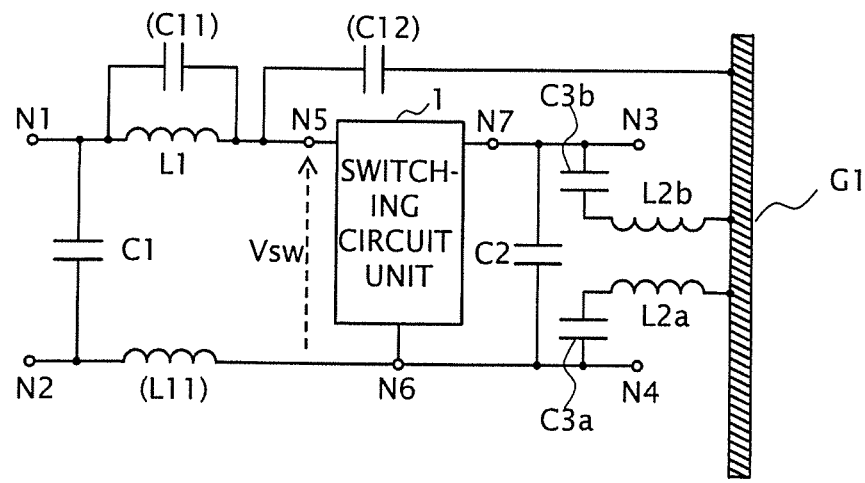
FIG. 13 is a circuit diagram showing a configuration of a switching circuit apparatus according to a third modified embodiment of the first embodiment.

FIG. 13 is a circuit diagram showing a configuration of the switching circuit apparatus according to the third modified embodiment of the first embodiment. In the switching circuit apparatus of FIG. 13, the inductor L2 of FIG. 1 is divided into an inductor L2a connected between the terminal N6 and the conductor part G1, and an inductor L2b connected between the terminal N7 and the conductor part G1. The switching circuit apparatus of FIG. 13 is further provided with: a capacitor C3a connected between the terminal N6 and the conductor part G1, in series with the inductor L2a; and a capacitor C3b connected between the terminal N7 and the conductor part G1, in series with the inductor L2b. The combined inductance of the inductors L2a and L2b of FIG. 13 connected in parallel to each other is equal to the inductance of the inductor L2 of FIG. 1. In this specification, the inductors L2a and L2b are also referred to as "third and fourth inductors".

Figure 14:
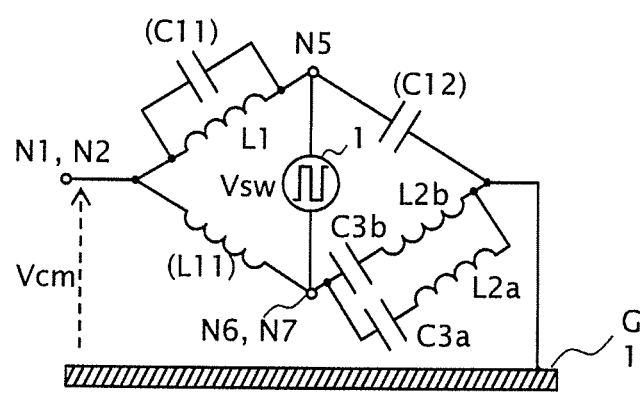
FIG. 14 is an equivalent circuit diagram of the switching circuit apparatus of FIG. 13.

FIG. 14 is an equivalent circuit diagram of the switching circuit apparatus of FIG. 13. The impedance between the terminals N6, N7 and the conductor part G1 is inductive in a frequency band equal to or higher than the resonance frequency of the series circuit part including the inductor L2a and the capacitor C3a, and equal to or higher than the resonance frequency of the series circuit part including the inductor L2b and the capacitor C3b. Therefore, the ratio of the combined inductance of the inductors L2a and L2b connected in parallel to each other, to the parasitic inductance L11 is set equal to the ratio of the parasitic capacitance C11 to the parasitic capacitance C12. In this case, there is an advantageous effect of reducing the common mode noise in the frequency band equal to or higher than the resonance frequency of the series circuit part including the capacitor C3a and the inductor L2a, and equal to or higher than the resonance frequency of the series circuit part including the capacitor C3b and the inductor L2b. Thus, it is possible to omit noise countermeasure components for blocking noise, while achieving the insulation between the positive and negative bus lines and the conductor part G1, and therefore, there is an advantageous effect of reducing the size and cost of the switching circuit apparatus.

The resonance frequencies of the series circuit parts including the inductors L2a and L2b and the capacitors C3a and C3b may be set equal to the resonance frequency of the parallel circuit part including the inductance L1, the latter resonance frequency being determined by the inductance of the inductor L1 and the parasitic capacitance C11. In this case, there is an advantageous effect of reducing the common mode noise in a frequency band not only equal to or higher than, but also below the resonance frequency of the parallel circuit part including the inductor L1 and the parasitic capacitance C11.

Comparing the switching circuit apparatus of FIGS. 11 and 13 with each other, the switching circuit apparatus of FIG. 11 has a fewer number of components than that of the switching circuit apparatus of FIG. 13. In addition, the inductance of the inductor L2 is smaller than the inductance of each of the inductors L2a and L2b. For example, L2=L2a/2=L2b/2. Therefore, there is an advantageous effect that the switching circuit apparatus of FIG. 11 has a smaller mounting area than that of the switching circuit apparatus of FIG. 13, thus reducing the cost. On the other hand, in the switching circuit apparatus of FIG. 11, since each of the capacitors C2, C3a, C3b has a parasitic inductance of about 10 nH, parallel resonance may occur in a 10 MHz band. Since the terminals N6 and N7 can not be regarded as a single node at the parallel resonance frequency, noise can not be reduced. Therefore, there is an advantageous effect that the switching circuit apparatus of FIG. 13 reduces noise in the 10 MHz band more stably than the switching circuit apparatus of FIG. 11.

Next, with reference to FIG. 15, a switching circuit apparatus according to a fourth modified embodiment of the first embodiment will be described.

Figure 15:
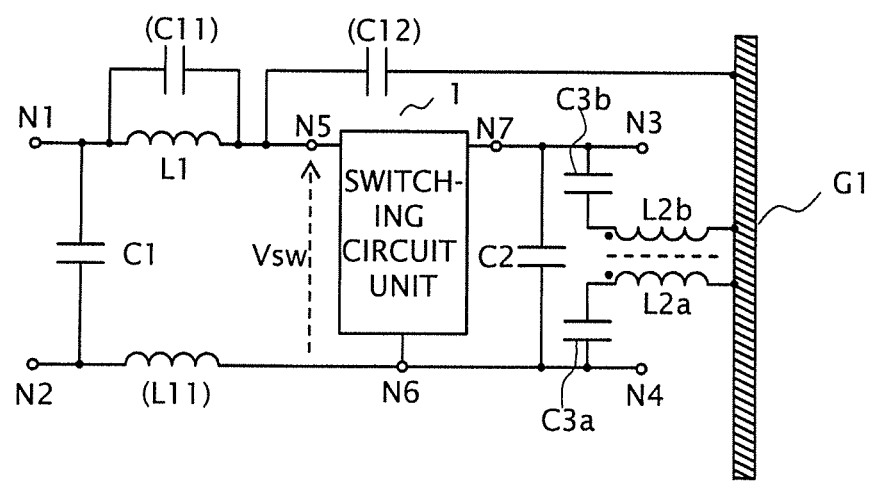
FIG. 15 is a circuit diagram showing a configuration of a switching circuit apparatus according to a fourth modified embodiment of the first embodiment.

FIG. 15 is a circuit diagram showing a configuration of the switching circuit apparatus according to the fourth modified embodiment of the first embodiment. The switching circuit apparatus of FIG. 15 is provided with the similar components to those of the switching circuit apparatus of FIG. 13. In this case, the inductors L2a and L2b are electromagnetically coupled to each other such that the magnetic fluxes are constructively added to each other when currents flow from the terminals N6 and N7 to the conductor part G1 through the inductors L2a and L2b, respectively. As described above, the sizes of the inductors L2a and L2b of FIG. 13 are larger than the size of the inductor L2 of FIG. 11. By electromagnetically coupling the inductors L2a and L2b to each other as shown in FIG. 15, there is an advantageous effect of reducing the inductance of each of the inductors L2a and L2b. Therefore, in the switching circuit apparatus of FIG. 15, there is an advantageous effect of further reducing the size of the switching circuit apparatus as compared to the switching circuit apparatus of FIG. 13.

Second Embodiment

There is a particularly important matter for designing a wiring layout of the switching circuit apparatus according to the first embodiment. The reason will be described below, with reference to an exemplary switching circuit apparatus provided with the switching circuit unit 1a of FIG. 3.

Figure 16:
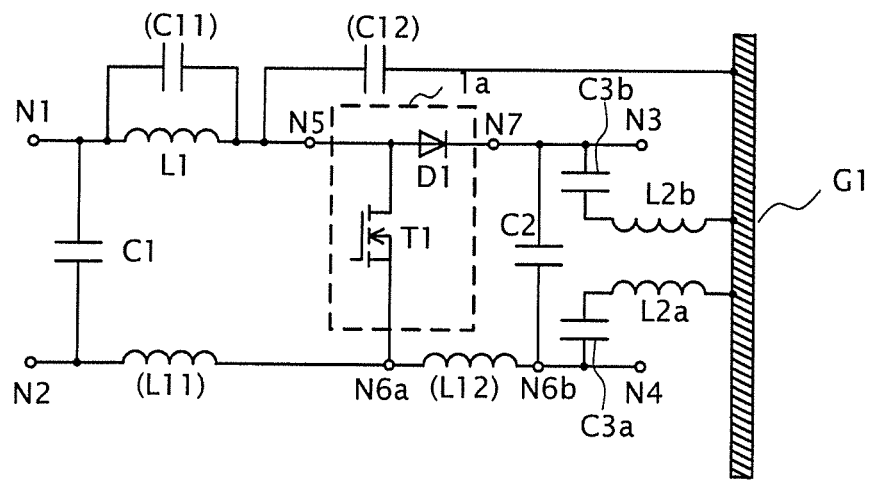
FIG. 16 is a circuit diagram showing a configuration of a switching circuit apparatus according to a comparison example.

FIG. 16 is a circuit diagram showing a configuration of a switching circuit apparatus according to a comparison example. The switching circuit apparatus of FIG. 16 is provided with the switching circuit unit 1a of FIG. 2, instead of the switching circuit unit 1 of FIG. 13. In the description of the first embodiment, it is mentioned that because the impedance of the capacitor C2 is low in the MHz band, the terminals N6 and N7 can be regarded as a single node. However, depending on a wiring layout, significant parasitic inductance L12 may appear in a wiring part connecting a terminal N6a of the switching circuit unit 1a, and a negative terminal N6b of the capacitor, as shown in FIG. 16.

Figure 17:
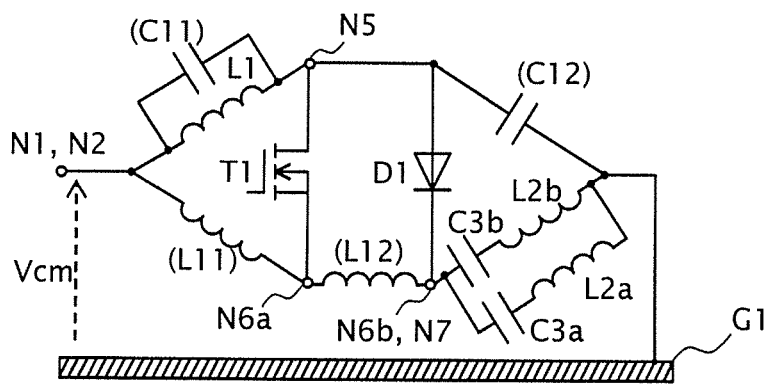
FIG. 17 is an equivalent circuit diagram of the switching circuit apparatus of FIG. 16.

FIG. 17 is an equivalent circuit diagram of the switching circuit apparatus of FIG. 16. When the switching circuit apparatus has the parasitic inductance L12, the terminals N6a, N6b, and N7 can not be regarded as a single node. In this case, the transistor T1 and the diode D1 can not be represented as a single noise source, and therefore, it is not possible to apply the principle described in the first embodiment for reducing the common mode noise.

Also in the switching circuit apparatus of FIG. 16, if both the following conditions are satisfied, then the principle of superposition can be applied, and it is possible to reduce the common mode noise arose from both the transistor T1 and the diode D1.

(1) The ratio of the impedance between a drain terminal of the transistor T1 and an anode terminal of the diode D1, and the impedance of the parasitic inductance L12 is equal to the ratio of the impedance of the parasitic capacitance C11, and the impedance of the parasitic inductance L11.

(2) The ratio of the impedance between the drain terminal of the transistor T1 and the anode terminal of the diode D1, and the impedance of the parasitic inductance L12 is equal to the ratio of the impedance of the parasitic capacitance C12, and the impedance of the combined inductance of the inductors L2a and L2b.

However, the impedance of the parasitic capacitance C11 and the impedance of the parasitic inductance L11 are a combination of a capacitive impedance and an inductive impedance. Similarly, the impedance of the parasitic capacitance C12 and the impedance of the combined inductance of the inductors L2a and L2b are a combination of a capacitive impedance and an inductive impedance. On the other hand, the impedance between a drain terminal of the transistor T1 and an anode terminal of the diode D1, and the impedance of the parasitic inductance L12 are both inductive. Therefore, in the switching circuit apparatus of FIG. 16, it is difficult to achieve impedance matching so as to reduce the common mode noise in a wide frequency range.

On the other hand, with reference to FIGS. 18 and 19, a wiring layout less susceptible to the parasitic inductance L12 will be described.

Figure 18:
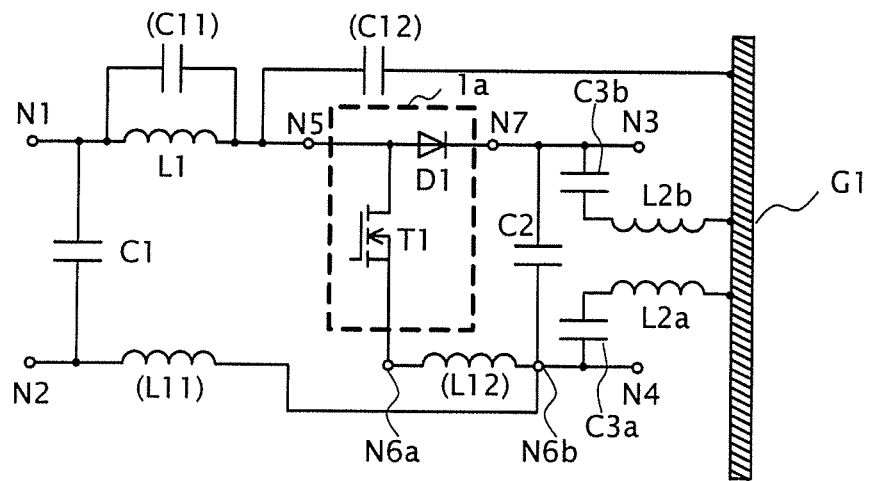
FIG. 18 is a circuit diagram showing a configuration of a switching circuit apparatus according to a second embodiment.

FIG. 18 is a circuit diagram showing a configuration of the switching circuit apparatus according to the second embodiment. An wiring line between a port terminal N2 and a terminal N6a includes: a first wiring part included in a wiring line between the terminal N6a and a capacitor C2; and a second wiring part branching from a branch point on the wiring line between the terminal N6a and the capacitor C2, and extending to the port terminal N2, the branch point being closer to one end of the capacitor C2 than to the terminal N6a. The branch point is provided as close as possible to the capacitor C2.

Figure 19:
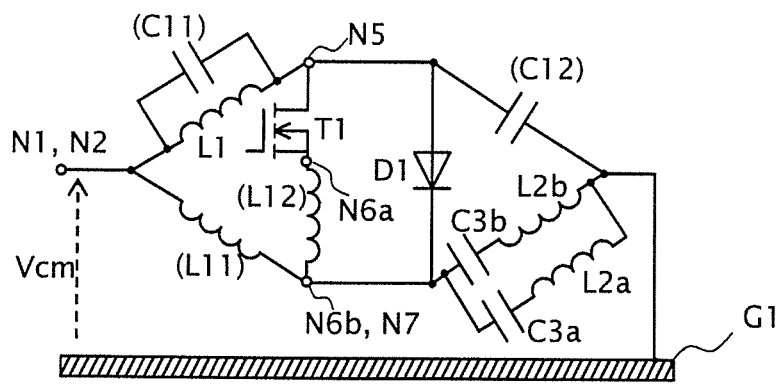
FIG. 19 is an equivalent circuit diagram of the switching circuit apparatus of FIG. 18.

FIG. 19 is an equivalent circuit diagram of the switching circuit apparatus of FIG. 18. The parasitic inductance L12 is included in the same branch as that of the transistor T1. Since the branch of the transistor T1 and a branch of the diode D1 are connected in parallel, the transistor T1 and the diode D1 can be represented as a single equivalent voltage source, with the parasitic inductance L12 being considered as an internal impedance. Therefore, it is possible to prevent an effect of reducing the common mode noise from being degraded due to the parasitic inductance L12.

Figure 20:
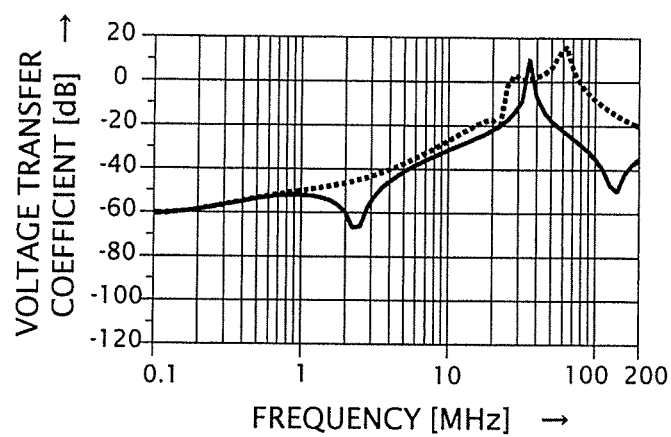
FIG. 20 is a graph showing frequency characteristics of a voltage transfer coefficient of the switching circuit apparatus of FIG. 16.
Figure 21:
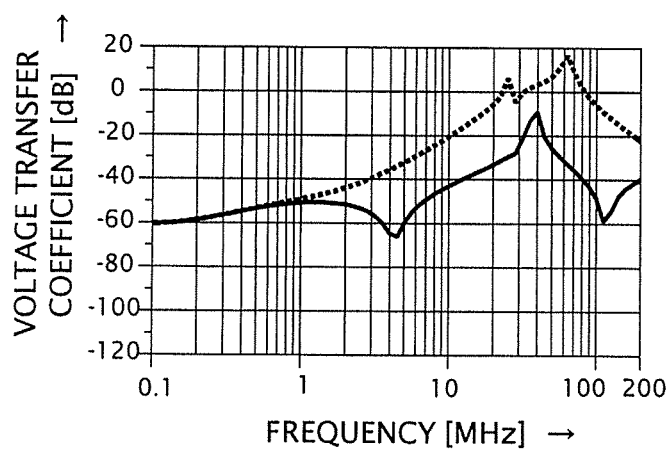
FIG. 21 is a graph showing frequency characteristics of a voltage transfer coefficient of the switching circuit apparatus of FIG. 18.

FIG. 20 is a graph showing frequency characteristics of a voltage transfer coefficient of the switching circuit apparatus of FIG. 16. FIG. 21 is a graph showing frequency characteristics of the voltage transfer coefficient of the switching circuit apparatus of FIG. 18.

For circuit simulations of FIG. 20 and FIG. 21, the capacitances and the inductances were set as shown in the following table.

| Element | Capacitance, Inductance |
| --- | --- |
| C1 | 1 µF |
| C2 | 1 mF |
| L1 | 400 µH |
| L2a, L2b | 0 nH or 1420 nH |
| C3a, C3b | 4700 pF |
| C11 | 220 pF |
| C12 | 35 pF |
| L11 | 110 nH |
| L12 | 10 nH |

FIG. 20 and FIG. 21 show the voltage transfer coefficient Vcm/Vsw from the switching circuit unit 1a to the port P1, when changing the inductances of the inductors L2a and L2b. Dotted lines indicate the case of 0 nH, and solid lines indicate the case of 1420 nH. The switching noise voltage Vsw appears between the terminals N5 and N6a during the operation of the transistor T1. The diode D1 was replaced with a capacitor of 1 nF, assuming the capacitance between the anode and the cathode. In addition, a series parasitic inductance of 10 nH is added to each of the capacitors C1 and C2.

With reference to FIG. 20, it can be seen that inserting the inductors L2a and L2b of 1420 nH does not result in sufficient reduction of the common mode noise. On the other hand, with reference to FIG. 21, it can be seen that inserting the inductors L2a and L2b of 1420 nH significantly reduces the common mode noise in the frequency band of 3 MHz to 30 MHz.

Third Embodiment

Figure 22:
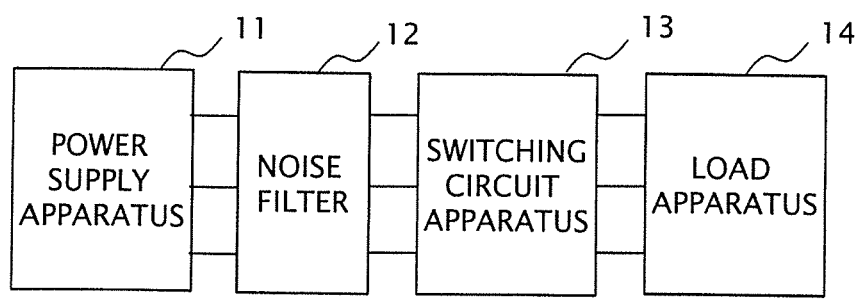
FIG. 22 is a block diagram showing a configuration of a power converter system according to a third embodiment.

FIG. 22 is a block diagram showing a configuration of a power converter system according to a third embodiment. The power converter system of FIG. 22 is provided with a power supply apparatus 11, a noise filter 12, a switching circuit apparatus 13, and a load apparatus 14. These components are connected to one another by a positive bus line, a negative bus line, and a ground line.

The switching circuit apparatus 13 is constituted in a manner similar to that of the switching circuit apparatuses of the first and second embodiments. In this specification, the switching circuit apparatus 13 is also referred to as "power converter apparatus". As described above, the switching circuit apparatuses of the first and second embodiments operate as, e.g., a boost converter. The port terminals N1 and N2 of the switching circuit apparatus 13 are connected to the power supply apparatus 11 via the noise filter 12, and the port terminals N3 and N4 of the switching circuit apparatus 13 are connected to the load apparatus 14. Although the switching circuit apparatus of the first and second embodiments can reduce the common mode noise propagated from the port terminals N1 and N2 to the power supply apparatus 11, it can not reduce the normal mode noise. Therefore, the power converter system of FIG. 22 reduces the normal mode noise using the noise filter 12. The power converter system of FIG. 22 has an advantageous effect of efficiently reducing both the common mode noise and the normal mode noise.

The switching circuit apparatuses and the power converter apparatus according to respective aspects of the present disclosure are configured as follows.

According to a first aspect, a switching circuit apparatus is provided, including: a first port terminal and a second port terminal, a first inductor, a switching circuit unit including at least one switching element, and a conductor part. The switching circuit unit is provided with at least a first terminal and a second terminal, the first terminal being connected to the first port terminal via the first inductor, the second terminal being connected to the second port terminal. The switching circuit apparatus has: a first capacitance provided between the first port terminal and the first terminal, a second capacitance provided between the first terminal and the conductor part, and a first inductance provided between the second port terminal and the second terminal. The switching circuit apparatus is further provided with: a first capacitor connected between the first port terminal and the second port terminal, and a second inductor connected between the second terminal and the conductor part.

According to a second aspect, in the switching circuit apparatus according to the first aspect, the second inductor has such an inductance that a ratio of the inductance of the second inductor to the first inductance is equal to a ratio of the first capacitance to the second capacitance.

According to a third aspect, in the switching circuit apparatus according to the first or second aspect, the first capacitance is a parasitic capacitance of a winding of the first inductor.

According to a fourth aspect, in the switching circuit apparatus according to the first or second aspect, the first capacitance includes a capacitance of a capacitor connected in parallel to the first inductor.

According to a fifth aspect, in the switching circuit apparatus according to one of the first to fourth aspects, the second capacitance is a parasitic capacitance appearing between a conductive portion of the switching element and the conductor part.

According to a sixth aspect, in the switching circuit apparatus according to one of the first to fourth aspects, the second capacitance includes a capacitance of a capacitor connected between the first terminal and the conductor part.

According to a seventh aspect, in the switching circuit apparatus according to one of the first to sixth aspects, the first inductance is a parasitic inductance of a wiring line between the second port terminal and the second terminal.

According to an eighth aspect, in the switching circuit apparatus according to one of the first to sixth aspects, the first inductance includes an inductance of an inductor connected between the second port terminal and the second terminal.

According to a ninth aspect, in the switching circuit apparatus according to one of the first to eighth aspects, the second inductor is a meander line formed on a printed wiring board.

According to a tenth aspect, in the switching circuit apparatus according to one of the first to ninth aspects, the switching circuit apparatus is further provided with a third port terminal and a fourth port terminal. The switching circuit unit is further provided with a third terminal, the third terminal being connected to the third port terminal, the second terminal being further connected to the fourth port terminal. The switching circuit apparatus is further provided with a second capacitor connected between the second terminal and the third terminal. The switching circuit unit includes: a first switching element connected between the first terminal and the second terminal; and a second switching element connected between the first terminal and the third terminal.

According to an eleventh aspect, in the switching circuit apparatus according to the tenth aspect, the switching circuit apparatus is further provided with a third capacitor connected between the second terminal and the conductor part, in series with the second inductor.

According to a twelfth aspect, in the switching circuit apparatus according to the eleventh aspect, a resonance frequency of a circuit part including the second inductor and the third capacitor is equal to a resonance frequency of a circuit part including the first inductor, the latter resonance frequency being determined by an inductance of the first inductor and the first capacitance.

According to a thirteenth aspect, in the switching circuit apparatus according to the eleventh aspect, the second inductor is connected to the second terminal via the third capacitor. The switching circuit apparatus is further provided with a fourth capacitor. wherein a connection point of the second inductor and the third capacitor is connected to the third terminal via the fourth capacitor.

According to a fourteenth aspect, in the switching circuit apparatus according to the thirteenth aspect, a resonance frequency of a circuit part including the second inductor, the third capacitor, and the fourth capacitor is equal to a resonance frequency of a circuit part including the first inductor, the latter resonance frequency being determined by an inductance of the first inductor and the first capacitance.

According to a fifteenth aspect, in the switching circuit apparatus according to the tenth aspect, the second inductor includes: a third inductor connected between the second terminal and the conductor part; and a fourth inductor connected between the third terminal and the conductor part. The switching circuit apparatus is further provided with: a third capacitor connected between the second terminal and the conductor part, in series with the third inductor; and a fourth capacitor connected between the third terminal and the conductor part, in series with the fourth inductor. An inductance of the second inductor is equal to a combined inductance of the third inductor and the fourth inductors connected in parallel to each other.

According to a sixteenth aspect, in the switching circuit apparatus according to the fifteenth aspect, a resonance frequency of a circuit part including the third inductor, the fourth inductor, the third capacitor, and the fourth capacitor is equal to a resonance frequency of a circuit part including the first inductor, the latter resonance frequency being determined by an inductance of the first inductor and the first capacitance.

According to a seventeenth aspect, in the switching circuit apparatus according to the fifteenth or sixteenth aspect, the third inductor and the fourth inductor are electromagnetically coupled to each other such that their magnetic fluxes are constructively added to each other when currents flows from the second terminal and the third terminals to the conductor part via the third inductor and the fourth inductor, respectively.

According to an eighteenth aspect, in the switching circuit apparatus according to one of the tenth to seventeenth aspects, a wiring line between the second port terminal and the second terminal includes: a first wiring part included in a wiring line between the second terminal and the second capacitor; and a second wiring part branching from a branch point on a wiring line between the second terminal and the second capacitor, and extending to the second port terminal, the branch point being closer to one end of the second capacitor than to the second terminal.

According to a nineteenth aspect, a power converter apparatus is provided with the switching circuit apparatus according to one of the tenth to eighteenth aspects. The first port terminal and the second port terminals are connected to a power supply apparatus. The third port terminal and the fourth port terminal are connected to a load apparatus. The switching circuit apparatus operates as a boost converter.

According to a twentieth aspect, in the power converter apparatus according to the nineteenth aspect, the power converter apparatus is further provided with a noise filter inserted between the first and second port terminals, and the power supply apparatus.

INDUSTRIAL APPLICABILITY

The switching circuit apparatus according to the present disclosure is useful for implementing a switching circuit apparatus used in an industrial switching power supply apparatus or the like, with low noise, a small size, and low cost.

REFERENCE SIGNS LIST 1, 1a, 1b: SWITCHING CIRCUIT UNIT,
2, 2a, 2b: CONTROL CIRCUIT,
11: POWER SUPPLY APPARATUS,
12: NOISE FILTER,
13: SWITCHING CIRCUIT APPARATUS,
14: LOAD APPARATUS,
C1, C2, C3, C3a, C3b: CAPACITOR,
C11, C12: PARASITIC CAPACITANCE,
D1: DIODE,
G1: CONDUCTOR PART,
L1, L2, L2a, L2b: INDUCTOR,
L11, L12: PARASITIC INDUCTANCE,
N1 to N4: PORT TERMINAL,
N5 to N7: TERMINAL,
P1, P2: PORT,
S1, S2: SWITCHING ELEMENT, and
T1, T2: TRANSISTOR.

The invention claimed is:
1. A switching circuit apparatus comprising:
a first port terminal and a second port terminal;
a first inductor;
a switching circuit unit including at least one switching element; and
a conductor part,
wherein the switching circuit unit comprises at least a first terminal and a second terminal, the first terminal being connected to the first port terminal via the first inductor, the second terminal being connected to the second port terminal via a wiring line,
wherein the switching circuit apparatus includes:
a first capacitance provided between the first port terminal and the first terminal;
a second capacitance provided between the first terminal and the conductor part; and
a first inductance provided between the second port terminal and the second terminal, and
wherein the switching circuit apparatus further comprises:
a first capacitor connected between the first port terminal and the second port terminal; and
a second inductor connected between the second terminal and the conductor part.
2. The switching circuit apparatus as claimed in claim 1, wherein the second inductor has such an inductance that a ratio of the inductance of the second inductor to the first inductance is equal to a ratio of the first capacitance to the second capacitance.
3. The switching circuit apparatus as claimed in claim 1, wherein the first capacitance is a parasitic capacitance of a winding of the first inductor.
4. The switching circuit apparatus as claimed in claim 1, wherein the first capacitance includes a capacitance of a capacitor connected in parallel to the first inductor.
5. The switching circuit apparatus as claimed in claim 1, wherein the second capacitance is a parasitic capacitance appearing between a conductive portion of the switching element and the conductor part.
6. The switching circuit apparatus as claimed in claim 1, wherein the second capacitance includes a capacitance of a capacitor connected between the first terminal and the conductor part.

7. The switching circuit apparatus as claimed in claim 1, wherein the first inductance is a parasitic inductance of a wiring line between the second port terminal and the second terminal.
8. The switching circuit apparatus as claimed in claim 1, wherein the first inductance includes an inductance of an inductor connected between the second port terminal and the second terminal.
9. The switching circuit apparatus as claimed in claim 1, wherein the second inductor is a meander line formed on a printed wiring board.
10. The switching circuit apparatus as claimed in claim 1, further comprising a third port terminal and a fourth port terminal,
wherein the switching circuit unit further comprises a third terminal, the third terminal being connected to the third port terminal, the second terminal being further connected to the fourth port terminal,
wherein the switching circuit apparatus further comprises a second capacitor connected between the second terminal and the third terminal, and
wherein the switching circuit unit includes:
a first switching element connected between the first terminal and the second terminal; and
a second switching element connected between the first terminal and the third terminal.
11. The switching circuit apparatus as claimed in claim 10, further comprising a third capacitor connected between the second terminal and the conductor part, in series with the second inductor.
12. The switching circuit apparatus as claimed in claim 11,
wherein a resonance frequency of a circuit part including the second inductor and the third capacitor is equal to a resonance frequency of a circuit part including the first inductor, the latter resonance frequency being determined by an inductance of the first inductor and the first capacitance.
13. The switching circuit apparatus as claimed in claim 11,
wherein the second inductor is connected to the second terminal via the third capacitor,
wherein the switching circuit apparatus further comprises a fourth capacitor, and
wherein a connection point of the second inductor and the third capacitor is connected to the third terminal via the fourth capacitor.
14. The switching circuit apparatus as claimed in claim 13,
wherein a resonance frequency of a circuit part including the second inductor, the third capacitor, and the fourth capacitor is equal to a resonance frequency of a circuit part including the first inductor, the latter resonance frequency being determined by an inductance of the first inductor and the first capacitance.
15. The switching circuit apparatus as claimed in claim 10,
wherein the second inductor includes:
a third inductor connected between the second terminal and the conductor part; and
a fourth inductor connected between the third terminal and the conductor part,
wherein the switching circuit apparatus further comprises:
a third capacitor connected between the second terminal and the conductor part, in series with the third inductor; and a fourth capacitor connected between the third terminal and the conductor part, in series with the fourth inductor, and wherein an inductance of the second inductor is equal to a combined inductance of the third inductor and the fourth inductors connected in parallel to each other.

16. The switching circuit apparatus as claimed in claim 15, wherein a resonance frequency of a circuit part including the third inductor, the fourth inductor, the third capacitor, and the fourth capacitor is equal to a resonance frequency of a circuit part including the first inductor, the latter resonance frequency being determined by an inductance of the first inductor and the first capacitance.

17. The switching circuit apparatus as claimed in claim 15, wherein the third inductor and the fourth inductor are electromagnetically coupled to each other such that their magnetic fluxes are constructively added to each other when currents flows from the second terminal and the third terminals to the conductor part via the third inductor and the fourth inductor, respectively.

18. The switching circuit apparatus as claimed in claim 1, wherein a wiring line between the second port terminal and the second terminal includes:

a first wiring part included in a wiring line between the second terminal and the second capacitor; and a second wiring part branching from a branch point on a wiring line between the second terminal and the second capacitor, and extending to the second port terminal, the branch point being closer to one end of the second capacitor than to the second terminal.

19. A power converter apparatus comprising a switching circuit apparatus, the switching circuit apparatus comprising:

a first port terminal and a second port terminal;

a first inductor;

a switching circuit unit including at least one switching element; and a conductor part, wherein the switching circuit unit comprises at least a first terminal and a second terminal, the first terminal being connected to the first port terminal via the first inductor, the second terminal being connected to the second port terminal via a wiring line, wherein the switching circuit apparatus includes:

a first capacitance provided between the first port terminal and the first terminal;

a second capacitance provided between the first terminal and the conductor part; and a first inductance provided between the second port terminal and the second terminal, and wherein the switching circuit apparatus further comprises:

a first capacitor connected between the first port terminal and the second port terminal; and a second inductor connected between the second terminal and the conductor part, wherein the first port terminal and the second port terminals are connected to a power supply apparatus, wherein the third port terminal and the fourth port terminal are connected to a load apparatus, and wherein the switching circuit apparatus operates as a boost converter.

20. The power converter apparatus as claimed in claim 19, further comprising a noise filter inserted between the first and second port terminals, and the power supply apparatus.

* * * * *